April 13, 1937.  A. TIMMERMANN  2,076,926

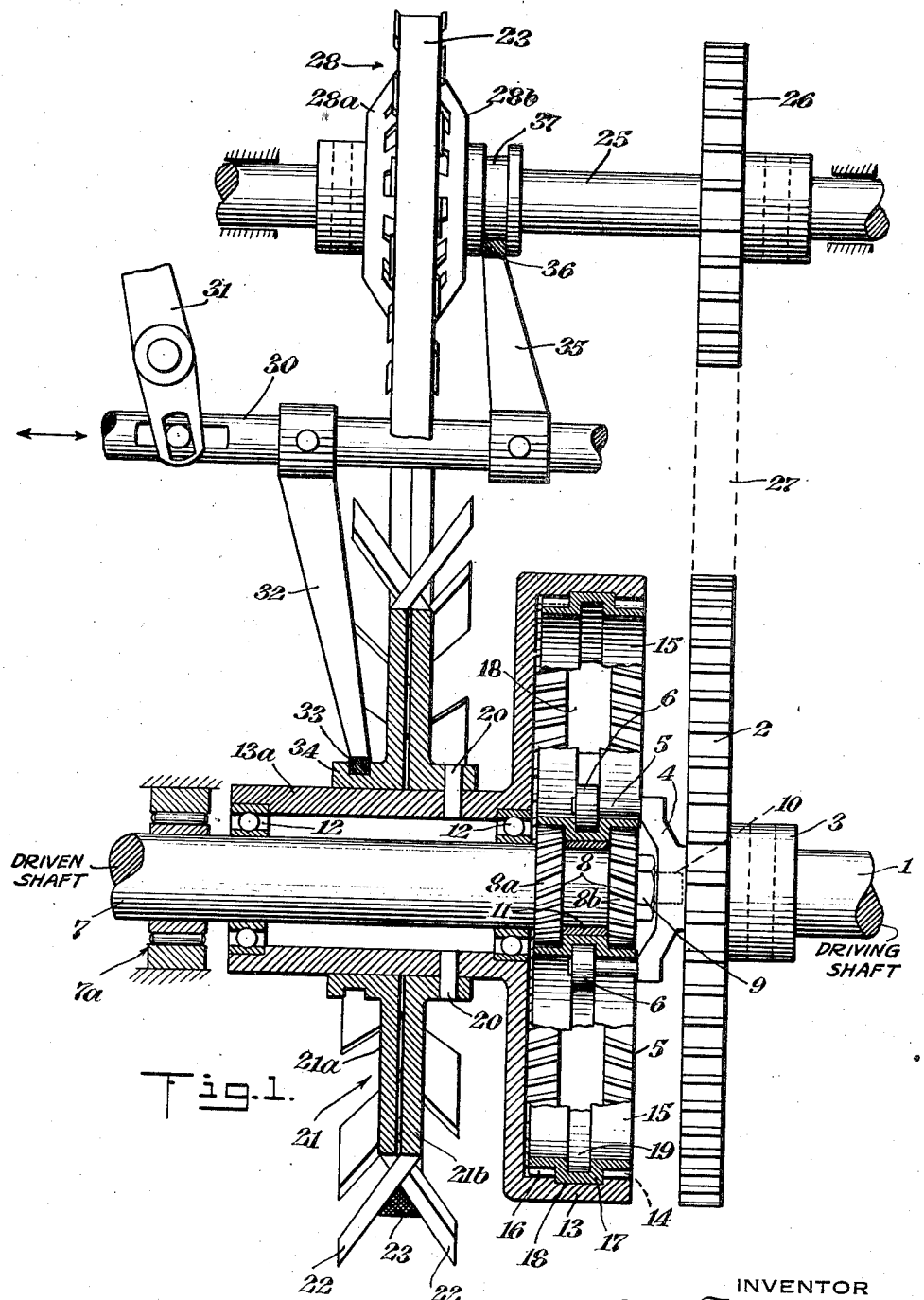

VARIABLE SPEED POWER DRIVE

Filed April 13, 1936   2 Sheets-Sheet 2

INVENTOR
August Timmermann
BY
his ATTORNEYS

Patented Apr. 13, 1937

2,076,926

UNITED STATES PATENT OFFICE 2,076,926

VARIABLE SPEED POWER DRIVE

August Timmermann, New York, N. Y.

Application April 13, 1936, Serial No. 74,056

2 Claims. (Cl. 74—286)

My invention relates to a type of variable speed planetary gear drive in which all gears remain in mesh at all times, the variation in speed between the driving and the driven shaft being effected by a belt drive in which the effective or driving diameters of the belt pulleys are variable in a particular novel manner to bring about a speed variation of the gear elements which control the speed of the gear. The invention further proposes to apply the power of the driving shaft to the planetary wheels at their pitch circle in a particularly effective manner.

The present application is a continuation in part of my copending application Serial No. 43,851, filed October 7, 1935, the subject matter of the present application relating to specific structural improvements on the subject matter of the invention disclosed in my earlier application.

Gear drives of this type are in themselves known in the art, even the aforementioned application of the driving power to the planetary wheels at their pitch circle instead of their center. The particular novelty of my invention relates therefore rather to certain novel constructive features in that type of gear drive by which certain advantages in the construction operation and efficiency of these gears are attained which will appear from the following description of my invention with the aid of the accompanying drawings in which—

Fig. 1 represents a side elevation of the entire gear drive, partly in central longitudinal section;

Figure 2:
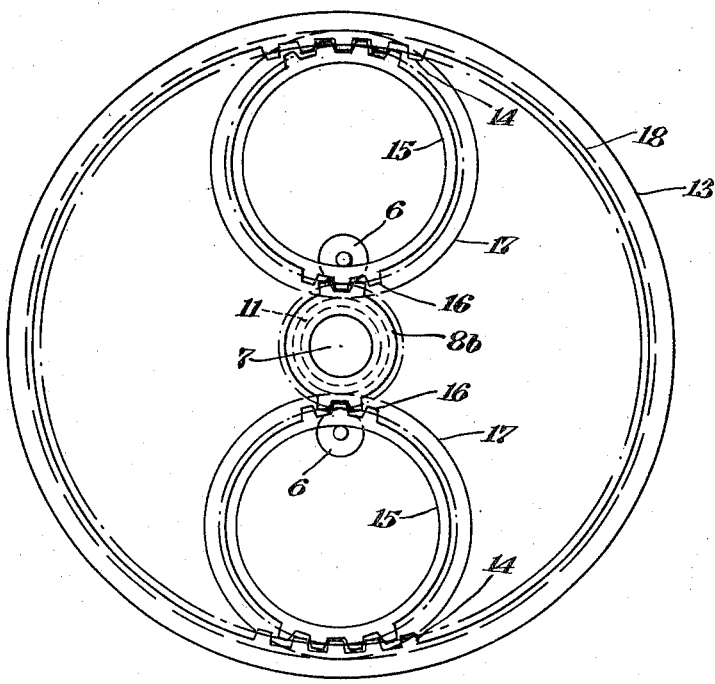
Fig. 2 represents in semi-diagrammatic fashion a front elevation of the planetary gear system.

Referring to Fig. 1, I is the driving shaft which may derive its power for instance directly from the engine of a motor vehicle, for which my novel power drive is especially well adapted. To shaft I is fixed a sprocket gear 2, the hub 3 of which carries a yoke 4 provided with two studs 5 at diametrically opposite sides, an anti-friction roller 6 being mounted at the end of each stud. The driven shaft 7 is journalled at 7ª in axial alinement with driving shaft I, and the outermost end of shaft 7 is guided in a step bearing 10 provided in yoke 4. Shaft 7 carries near its end two spaced pinions 8ª and 8ᵇ of equal pitch and construction of which 8ª may constitute an integral portion of shaft 7, while pinion 8ᵇ is attached to the shaft end by any suitable means known in the art of motor vehicle construction, such as cones, keys, square shaft ends or the like. This latter pinion is held axially in fixed position by a nut 9 threaded onto the shaft end. Between these two pinions is inserted a bearing collar II, the purpose of which will appear presently. On the end of shaft 7 is journalled, preferably by means of a ball bearing 12, a cylindrical casing 13 provided with an inner toothing 14 and of an inner diameter considerably larger than that of pinions 8ª, 8ᵇ, and having its cylindrical wall portion located in the same plane with pinions 8ª, 8ᵇ, so that two planetary gear rings 15 may be placed between these pinions and the geared casing wall 13 to mesh with the pinions as well as with the inner toothing 14 of the casing wall (see also Fig. 2). I shall refer in the further description and in the annexed claims to these elements as the central pinion 8 (composed of 8ª, 8ᵇ), the planetary rings (15) and the control wheel (casing 13 with gear 14).

Planetary rings 15, as will be noted from Fig. 1, are each provided with a central outer peripheral bead 17 which divides the outer gearing of these rings into two peripheral halves. A corresponding inner peripheral groove 18 is provided in the control wheel 13 which divides the inner toothing 14 of this wheel into similar peripheral halves, so that when planetary rings 15 are in mesh within control wheel 13 their beads 17 engage in groove 18 and their gearings laterally of this bead mesh respectively with the gearings laterally of groove 18, so that the latter forms a retainer for rings 15 in axial direction. Similarly the bead 17 of each planetary ring engages between the two complementary gear elements 8ª, 8ᵇ of the central pinion 8, which elements respectively engage the appertaining gearing halves of the planetary rings. The previously mentioned sleeve II between central pinion elements 8ª, 8ᵇ serves thus as a rolling abutment for the planetary rings 15. If necessary sleeve II may be replaced by a roller bearing (not shown). In this manner these planetary rings are always held laterally positioned on diametrically opposite sides and compelled to operate in their plane. This construction has the further advantage, aside from convenient assembly, that all gears can be cut with herring bone teeth as shown, by inclining the teeth of each gear half opposite to the direction in which the teeth of the other, complementary gear half are inclined, whereby all axial thrust incident to this type of gear is compensated. The use of this type of teeth is of great advantage on account of the well-known good running qualities, but has been difficult to use heretofore in this kind of drive construction on account of the requirement of heavy thrust bearings.

Planetary rings 15 are further provided each with an inner peripheral groove 19 which follows the contour of outer bead 17 and which is of sufficient depth so that when rollers 6 of yoke 4, previously described, engage in these grooves, they engage the planetary rings at the pitch circle of central pinion 8. Thus, when the yoke is rotated by driving shaft 1, the driving power is applied to the central pinion 8 at or very close to its pitch circle, and thus only a very small amount of power is necessary to operate the control wheel 13 for producing the different speeds of central pinion 8 and the driven shaft 7. For instance when such a transmission is used in a motor vehicle of average commercial horse power, an ordinary V-belt of a cross-section approximating that of V-belts used in domestic washing machines or similar small power transmission is sufficient to take care of the varying speed drive of control wheel 13, which drive I shall now describe with reference to Fig. 1.

Figure 3:
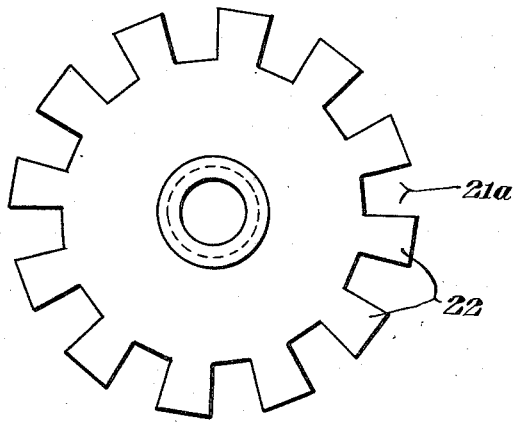
Fig. 3 represents in front elevation one-half of one of the variable diameter belt pulleys.

To the outside of bearing sleeve 13ª of control wheel 13 is fixed, such as by pins 20, the driven V-pulley 21 which is constructed so that its effective diameter, i. e. the diameter of its V-groove, can be varied in the following manner. This pulley is composed of two complementary elements 21ª and 21ᵇ, of which 21ᵇ is fixed to sleeve 13ª as aforementioned while 21ª is loose on the sleeve. Each pulley element is disc-shaped and provided at its periphery with a suitable number of uniformly spaced sector shaped arms 22, inclined at a suitable angle to the own disc plane and toward the complementary pulley element. These arms are of a width in each pulley element so that they closely fit into the interstitial spaces left between the arms of the complementary element, which, while permitting the two elements to be moved in axial direction relative to one another, locks the two elements together in circumferential direction. In Fig. 1 the disc portions of the two elements 21ª and 21ᵇ are shown pushed close together and the arms 22 of each element are pushed entirely between the arms of the other. In Fig. 3 pulley element 21ª is shown in front elevation. Thus, as will be noted from Fig. 1, the two groups of arms 22 of the two pulley elements form a circumferential V-groove in the bottom of which the V-belt 23 rests. Also a round belt may be used if desired. If now the loose pulley element 21ª in Fig. 1 is shifted to the left, the two groups of arms do not inter-engage quite so deeply and the circumferential diameter of the V-groove of the entire pulley becomes correspondingly larger and larger until the maximum diameter is reached at which a V-groove can still effectively be formed by the two groups of arms.

In parallel to shafts 1 and 7 is suitably journalled jack shaft 25 which is driven at a suitable ratio from sprocket wheel 2 by way of a silent chain 27 and a sprocket wheel 26 fixed on jack shaft 25. On this shaft is fixed a variable diameter V-groove pulley 28 of a construction similar to that described with reference to pulley 21, and disposed in alinement with, and forming the driving pulley for the latter. Pulley 28 has its complementary element 28ª fixed to jack shaft 25 and its complementary element 28ᵇ loosely mounted thereon. A shifting bar 30, which may be operated by hand or foot or in any other way adequate under the given conditions, is slidably mounted between and in parallel to driven shaft 7 and jack shaft 25, which bar has fixed to it a shift arm 32 whose fork 33 engages a grooved collar 34 provided on loose pulley element 21ª, and a shift arm 35 whose fork 36 engages a grooved collar 37 provided on loose pulley element 28ᵇ. It will be noted from Fig. 1 that these shift arms are set on shifting bar 30 so that V-pulley 28 has its largest effective diameter while V-pulley 21 has its smallest diameter. Consequently when bar 30 is thrown to the left, the drive diameter of pulley 28 becomes smaller, and that of pulley 21 becomes larger, and the latter is now driven at a speed slower than that at which it was driven with the setting of the pulley diameter shown in Fig. 1, assuming that drive shaft 1 runs always at constant speed. It thus becomes possible to regulate the speed of control wheel 13 at will within a given range determined by the construction and purpose of the drive. Since, as previously explained, the power required for operating control wheel 13 is comparatively very small, this pulley construction may be very light and quite small.

Aside from its simpler, cheaper and more rugged construction the aforedescribed variable diameter V-groove pulley drive has the following principal advantage over variable diameter pulley drives of the prior art which employ the same fundamental principle—the dividing of each pulley into two parallel complementary elements with inclined faces and moving the elements toward and away from one another in axial direction. So far as I am aware, the prior art has attempted to solve this problem by mounting its two parallel complementary elements of each pulley entirely apart from one another, and by providing them with oppositely inclined cone-shaped faces. This, as the prior art shows of which I am aware, requires always a flat belt of considerable width. In order to increase the effective driving diameter of such a pulley, its two complementary halves must be shifted toward one another which may only be done by initially leaving a considerable space between them, and which in turn to bridge requires, as stated before, a belt of considerable width. Belts of this type may not be too thick in order to avoid undue stiffness, yet the lateral pressure necessary to produce sufficient friction against a thin belt in order to produce the necessary traction is often sufficient in such cases to buckle such a wide belt and make the shifting of the pulley components for a different speed ratio difficult, even while the belt runs, and cause the belt to jam crooked between the two discs. By the novel construction forming part of the subject matter of the present invention all these defects are avoided because in the present case the belt may be thick and narrow, providing thereby ample lateral traction, and the component pulley halves are shifted toward one another instead of away, when the pulley diameter is to be decreased and away from one another when it is to be enlarged. Owing to the fact that in the present case the V-belt or round belt runs always practically at the bottom of the groove the two groups of pulley arms push the belt outwardly from the bottom of the groove, as it were, when the groove diameter is being enlarged and thus make a ratio change possible without undue force, even at standstill.

The entire transmission gear operates as follows with the following gear ratios as an example:

The central pinion 8 of the driven shaft may have sixteen teeth in each of its elements 8ª, 8ᵇ. The planetary rings 15 may each have thirty-two teeth, and control wheel 13 may have eighty teeth. If it is desired for the moment that the driven shaft 7 should stand still with the driving shaft running at a constant speed, control wheel 13 must then run sixteen teeth ahead of the driving shaft for each revolution of the latter. In other words, assuming a constant speed of the driving shaft of 1000 R. P. M., the control wheel must be driven at 1200 R. P. M. The operator would accordingly shift bar 30 so that the transmission ratio of pulleys 28 and 21 is regulated so that this occurs. If it is desired to drive shaft 7 at the same speed as that of shaft 1, the speed of control wheel 13 is gradually reduced, by adjusting the relative diameters of pulleys 28 and 21, until it becomes equal to that of shaft 1 when shaft 7 will turn at 1000 R. P. M. If it is desired to run shaft 7 in the reverse direction, the speed of control wheel 13 is increased beyond 1200 R. P. M. to the desired extent by accordingly adjusting by means of shifting bar 30 the driving diameters of pulleys 21 and 28 to the proper ratio so that this control wheel speed is attained. While in this given case at the standstill of shaft 7, at its reverse operation, and at all intermediate speeds up to, but not at 1000 R. P. M. of shaft 7, planetary rings rotate at varying speeds on their own axes, they cease to do so at a speed of 1000 R. P. M. of the control wheel, when shaft 7 rotates also at that speed (which is here taken as the normal speed of shaft 7) and the planetary gear elements 8, 15 and 13 become relatively stationary and rotate together as a fixed unit and together with shaft 1 and 7. In other words no wear on the gears occurs at that speed setting, which may be comparable to the "high gear" position of the conventional transmission in the present day motor vehicle. Very little power is necessary for belt 23 to transmit in this position with the present construction.

While I have shown, merely for convenience of illustration, only two planetary rings 15, as many rings and corresponding drive arms on yoke 4 may be employed as may be conveniently accommodated within control wheel 13. Also the entire gear drive may be encased in a dust proof casing which would represent the transmission case in the motor vehicle.

I claim:

1. In a variable speed power drive having a driving and a driven shaft, a planetary gear having a central gear fixed on the driven shaft, an inside toothed control wheel running free with respect to said driven shaft and disposed coaxially therewith, and a plurality of planetary ring gears in mesh with said central gear and said control wheel inside of the latter, said ring gears having each a central peripheral bead on its outer periphery extending beyond the pitch circle of the central gear and an inner peripheral groove extending into said bead sufficiently deep to bring the groove in axial direction in line with the pitch circle of said central gear, a central peripheral groove in said central gear and in said control wheel toothing to receive and support said bead, means on said driving shaft for engaging the grooves of said planetary rings at the pitch circle of said central gear for applying the torque of said driving shaft directly at the pitch circle of said latter gear, and means for rotating said control wheel at desired varying speed ratios with respect to the speed of the driving shaft, for producing a speed variation of the driven shaft with respect to the driving shaft.

2. In a variable speed power drive having a driving and a driven shaft, a planetary gear having a central gear fixed on the driven shaft, an inside toothed control wheel running free with respect to said driven shaft and disposed coaxially therewith, and a plurality of planetary ring gears in mesh with said central gear and said control wheel inside of the latter, said ring gears having each a central peripheral bead on its outer periphery extending beyond the pitch circle of the central gear and an inner peripheral groove extending into said bead sufficiently deep to bring the groove in axial direction in line with the pitch circle of said central gear, a central peripheral groove in said central gear and in said control wheel toothing to receive and support said bead, a yoke fixed on said driving shaft and having a number of arms equal to the number of ring gears, a boss on each arm and a roller thereon, positioned to engage in the inner peripheral groove of its appertaining ring gear substantially in line with the pitch circle of said central gear, for applying the torque of said driving shaft directly at the pitch circle of said latter gear, and variable speed transmission gears between said driving shaft and said control wheel for rotating the latter at desired varying speed ratios with respect to said driving shaft, for producing a speed variation of the driven shaft with respect to the driving shaft.

AUGUST TIMMERMANN.